United States Patent
Friedrich et al.

(10) Patent No.: US 7,852,355 B2
(45) Date of Patent: Dec. 14, 2010

(54) SYSTEM AND METHOD FOR CARRYING OUT AND VISUALLY DISPLAYING SIMULATIONS IN AN AUGMENTED REALITY

(75) Inventors: Wolfgang Friedrich, Bubenreuth (DE); Soeren Moritz, Wimmelbach (DE); Michael Schlereth, Wilhermsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 1171 days.

(21) Appl. No.: 10/578,940

(22) PCT Filed: Nov. 3, 2004

(86) PCT No.: PCT/EP2004/052783

§ 371 (c)(1),
(2), (4) Date: May 9, 2006

(87) PCT Pub. No.: WO2005/045729

PCT Pub. Date: May 19, 2005

(65) Prior Publication Data
US 2007/0088526 A1      Apr. 19, 2007

(30) Foreign Application Priority Data
Nov. 10, 2003 (DE) ............................... 103 52 893
Apr. 2, 2004 (DE) ....................... 10 2004 016 329

(51) Int. Cl.
*G09G 5/00* (2006.01)
(52) U.S. Cl. ...................................... 345/633; 345/632
(58) Field of Classification Search ................. 345/633, 345/632
See application file for complete search history.

(56) References Cited

U.S. PATENT DOCUMENTS

| | | | | |
|---|---|---|---|---|
| 5,625,765 A * | 4/1997 | Ellenby et al. | ............... | 345/633 |
| 5,815,411 A * | 9/1998 | Ellenby et al. | ............... | 702/150 |
| 5,997,913 A | 12/1999 | Fowler et al. | | |
| 6,633,304 B2 * | 10/2003 | Anabuki et al. | ............. | 345/633 |
| 6,738,040 B2 * | 5/2004 | Jahn et al. | .................... | 345/156 |
| 6,941,248 B2 * | 9/2005 | Friedrich et al. | ........... | 702/188 |
| 7,002,551 B2 * | 2/2006 | Azuma et al. | ............... | 345/158 |
| 7,050,078 B2 * | 5/2006 | Dempski | .................... | 715/700 |
| 7,298,385 B2 * | 11/2007 | Kazi et al. | ................... | 345/633 |

(Continued)

FOREIGN PATENT DOCUMENTS

WO        00/52536 A1       9/2000

OTHER PUBLICATIONS

Fiorentino, Spacedesign: A Mixed Reality Workspace for Aesthetic Industrial Design, IEEE,2002, pp. 1-10.*

(Continued)

*Primary Examiner*—M Good Johnson

(57) ABSTRACT

The invention relates to a system and method inside an augmented reality system for visually displaying simulation results in a mixed virtual-real environment. The system and method permit one or more users to carry out simulation processes in the context of a real environment, particularly in the field of industrial automation systems and to visually display their static and dynamic results in the contest of the real environment. Processes running in the real environment are detected and synchronized with the simulation. A control unit enables a reciprocal influencing of real processes with the simulation. In addition, the user can control the execution of the simulation via a user interface.

4 Claims, 2 Drawing Sheets

U.S. PATENT DOCUMENTS

| | | | |
|---|---|---|---|
| 7,324,081 B2 * | 1/2008 | Friedrich et al. | 345/156 |
| 7,394,459 B2 * | 7/2008 | Bathiche et al. | 345/175 |
| 7,493,153 B2 * | 2/2009 | Ahmed et al. | 600/407 |
| 2002/0044104 A1 * | 4/2002 | Friedrich et al. | 345/8 |
| 2002/0046368 A1 * | 4/2002 | Friedrich et al. | 714/45 |
| 2002/0067372 A1 * | 6/2002 | Friedrich et al. | 345/753 |
| 2002/0069072 A1 * | 6/2002 | Friedrich et al. | 704/275 |
| 2003/0014212 A1 * | 1/2003 | Ralston et al. | 702/150 |
| 2003/0210228 A1 * | 11/2003 | Ebersole et al. | 345/157 |

OTHER PUBLICATIONS

Toshikazu Ohshima, Tsuyoshi Kuroki, Hiroyuki Yamamoto, and Hideyuki Tamura; "A Mixed Reality System with Visual and Tangible Interaction Capability—Application to Evaluating Automobile Interior Design"; Proceedings of the Second IEEE and ACM International Symposium on Mixed and Augmented Reality (ISMAR '03); Oct. 7-10, 2003; pp. 284-285; XP-010662830; ISBN: 0-7695-2006-5; Piscataway, NJ, USA.

Simon Prince, Adrian David Cheok, Farzam Farbiz, Todd Williamson, Nik Johnson, Mark Billinghurst, Hirokazu Kato; "3-D Live: Real Time Interaction for Mixed Reality"; Nov. 16-20, 2002; New Orleans, Louisiana; pp. 364-371; XP-002319784; ACM Press; New York, NY, USA.

Eric W. Tatham; "Optical Occlusion and Shadows in a 'See-through' Augmented Reality Display"; Information Visualization; Proceedings of the IEEE International Conference on London, UK; Jul. 14-16, 1997; pp. 128-131; XP-010345999; ISBN: 0-7695-0210-5; Los Alamitos, CA, USA.

Ronald T. Azuma; "A Survey of Augmented Reality"; Presence: Teleoperators and Virtual Environments 6; Aug. 4, 1997; pp. 1-48; XP-002254668; ISBN: 1054-7460, Cambridge, MA, USA.

* cited by examiner

SYSTEM AND METHOD FOR CARRYING OUT AND VISUALLY DISPLAYING SIMULATIONS IN AN AUGMENTED REALITY

CROSS REFERENCE TO RELATED APPLICATIONS

This application claims priority to the German applications No. 10352893.8, filed Nov. 10, 2003, and No. 10 2004 016 329.4, filed Apr. 2, 2004 and to the International Application No. PCT/EP2004/052783, filed Nov. 3, 2004 which are incorporated by reference herein in their entirety.

FIELD OF INVENTION

The invention relates to a system and a method for presentation of information, especially augmented-reality information, to at least one user.

BACKGROUND OF INVENTION

This type of system or method is used for example in the planning of work processes and other processes in an industrial environment.

Augmented Reality, abbreviated to AR, is a new type of human-environment interaction with great potential for supporting industrial work processes and other processes before and during process execution sequences. With this technology the field of view of the observer is enriched with computer-generated virtual objects so that product and process information can be intuitively recorded and used. In addition to very simple interaction between human beings and their environment, the use of wearable computers includes AR application fields with high mobility requirements such as in production shops for example geographically distributed systems or high-volume conveyor equipment. Augmented reality is already being developed for production and service applications.

SUMMARY OF INVENTION

An object of the invention is to specify a system and a method which makes it possible to visually display simulation results in context to real installations in an augmented reality system. With the aid of this system planned d processes or also fictional situations such as grouping together of visitors, error cases in existing or planned systems etc can be visually displayed directly in the real environment and thus brought to life for the user.

This object is achieved by a system for presentation of information, especially augmented-reality information, for at least one user with
 At least one recording unit for recording an environment and for generating the corresponding environment information which identifies a position and/or an orientation of the system with reference to the environment,
 At least one simulation system for generating simulation data,
 At least one processing unit for linking the environment information and image information continuously modified on the basis of the simulation data and stored in a first storage medium.

This object is further achieved by a method for presenting information, especially augmented-reality information, for at least one user, in which
 An environment is recorded and corresponding environment information which identified as a position and/or an orientation of the system in relation to the environment is generated with the aid of at least one recording unit,
 Simulation data is generated with the aid of at least one simulation system,
 The environment information and the image information continuously modified on the basis of the simulation data and stored in a first storage medium are linked with the aid of a processing unit.

The linkage of the data generated with the aid of the simulation system to the environment information related to the real environment enables the simulation results to be displayed visually within the context of the real environment. Simulation results are transferred in to the reality with the aid of augmented reality and visually displayed there in a mixed virtual-real world. In this case the dynamic results of the simulation are transported into the real world in accordance with their dynamics and thereby brought to life for the viewer. Simulations, which have only been undertaken to date in purely virtual environments, can be presented in reality with the inventive system or with the inventive method without complex modeling of the real environment being necessary. Corruptions of the real environment and resulting incorrect feedback which can never be completely excluded in a simulation of reality are avoided by the inventive combination of simulation techniques and augmented-reality technology.

In addition to augmentation of the reality by real objects (e.g. goods for transport) the simulation can also be employed as a forecasting tool. In this case for example a forecast can be generated by a simulation indicating that a problem is likely to occur in the near future at a machine or a conveyor device. Then for example the environment of the machine can be colored yellow or red as a warning (or the virtual exploding vessel can be displayed).

The inventive system can for example be employed advantageously for the following tasks:
 Presenting the volume of goods transported in production equipment and conveyor equipment depending on different system states (failure, availability with redundant lines, effects on throughput such as congestion)
 Presentation of visitors to exhibitions in the real exhibition environment (e.g. flow of people to trade fair stands, through emergency exits, at production lines, etc. . . . )
 Presentation of temperature curves in tunnel ovens depending on equipping (number of pallets with tiles) and material
 Presentation of the processing state of a workpiece in a machine tool in the future or in the past (benefit? How long will processing take?)

In an advantageous embodiment of the invention the processing unit is embodied such that it is used for calculating concealments of virtual objects by an existing real installation in the recording area of the system on the basis of the image information stored in the first storage medium, and for generating a volume of data to describe the virtual objects, with the surfaces of the virtual objects concealed by the real installation being edited out. In this way a volume of data to reproduce a 3-dimensional model is generated, the presentation of which makes it possible for the user to visualize the precise position of virtual and real objects in all three spatial dimensions. By editing out of the parts of the virtual objects concealed by the real objects a virtual object positioned behind a real object is also perceived as such by the user.

Advantageously the system features at least one reproduction unit for presenting the volume of data generated by the processing unit. Two different methods can be employed in the reproduction of the augmented-reality information.

The reproduction unit can be embodied as a head-mounted display, with the objects described by the image information generated by the processing unit being displayed directly in the field of view of the user and the user continuing to directly perceive the part of the actual reality not concealed by the image information of the described objects. This type of presentation of augmented-reality information involves what is referred to as an optical see-through method.

As an alternative the reproduction unit is embodied such that the objects described by the image information generated by the processing unit and the part of the actual reality not concealed by the objects described by the image information are presented, with the device for doing this especially featuring at least one image recording unit which is embodied for example as a video camera to record the actual reality. This embodiment makes it possible to present the augmented-reality information to a number of users. This type of presentation of augmented-reality information is what is known as the video see-through method. In this case the parts of the virtual objects described by the image information and not concealed by real objects are displayed in the image recorded by the video camera and presented on one or, if a video splitter is used for example, in a number of reproduction units. The reproduction units can be a head-mounted displays and/or conventional monitors which can be positioned especially at locations remote from the actual reality.

In an advantageous embodiment the system features at least one application controller to control the simulation system and/or at least one real process. The application controller allows the activation and the control of real and virtual processes. In addition it presents the available commands and the current status of the system, for example using a video card, with the aid of the reproduction unit. To control a real process a process controller is expediently additionally provided which contains the necessary scheduling system and the necessary control programs to control a system or system components in accordance with a predetermined schedule (e.g. a PLC with its associated data and function components).

To give the user the opportunity of activating and controlling real processes and simulations, the system comprises at least one user interface which allows the user to activate the simulation system and/or at least one real process. The user inter face can comprise different input devices, such as mouse, keyboard, microphone, etc. for example. The signals delivered by the input devices are converted in accordance with corresponding device drivers into commands for the application controller.

Expediently the system features a second storage medium in which current status values of the real process, especially sensor values and/or actuator values to be set are stored.

In an advantageous embodiment the simulation system is embodied such that the execution of a simulation can be continuously influenced by status values stored in the second storage medium and/or status values stored in the second storage medium can be modified by the simulation system. The opportunity of accessing the status s values stored in the second storage medium enables the simulation system to react to current statuses of a real process and to influence an ongoing simulation accordingly. Furthermore the simulation system can modify status values and thus influence an ongoing real process.

To influence a real process and/or to record status parameters of a real process at least one process connection is provided in an advantageous embodiment which allows the modification of the status of a real process, especially depending on the status values stored in the second storage medium and the recording of the current status of a real process.

In a further advantageous embodiment of the system a third storage medium is provided in which data is stored which allows a reconstruction of a process simulated by means of the simulation system. The third storage medium contains the continuous and cyclic data which has been recorded over a defined period of time. It is sufficiently accurate to be able to play back processes recorded by the simulation system in slow motion or fast motion, both forwards and also backwards along the time axis.

BRIEF DESCRIPTION OF THE DRAWINGS

The invention is described and explained in more detail below on the basis of the exemplary embodiments shown in the Figures. The figures show.

DETAILED DESCRIPTION OF INVENTION

Figure 1:
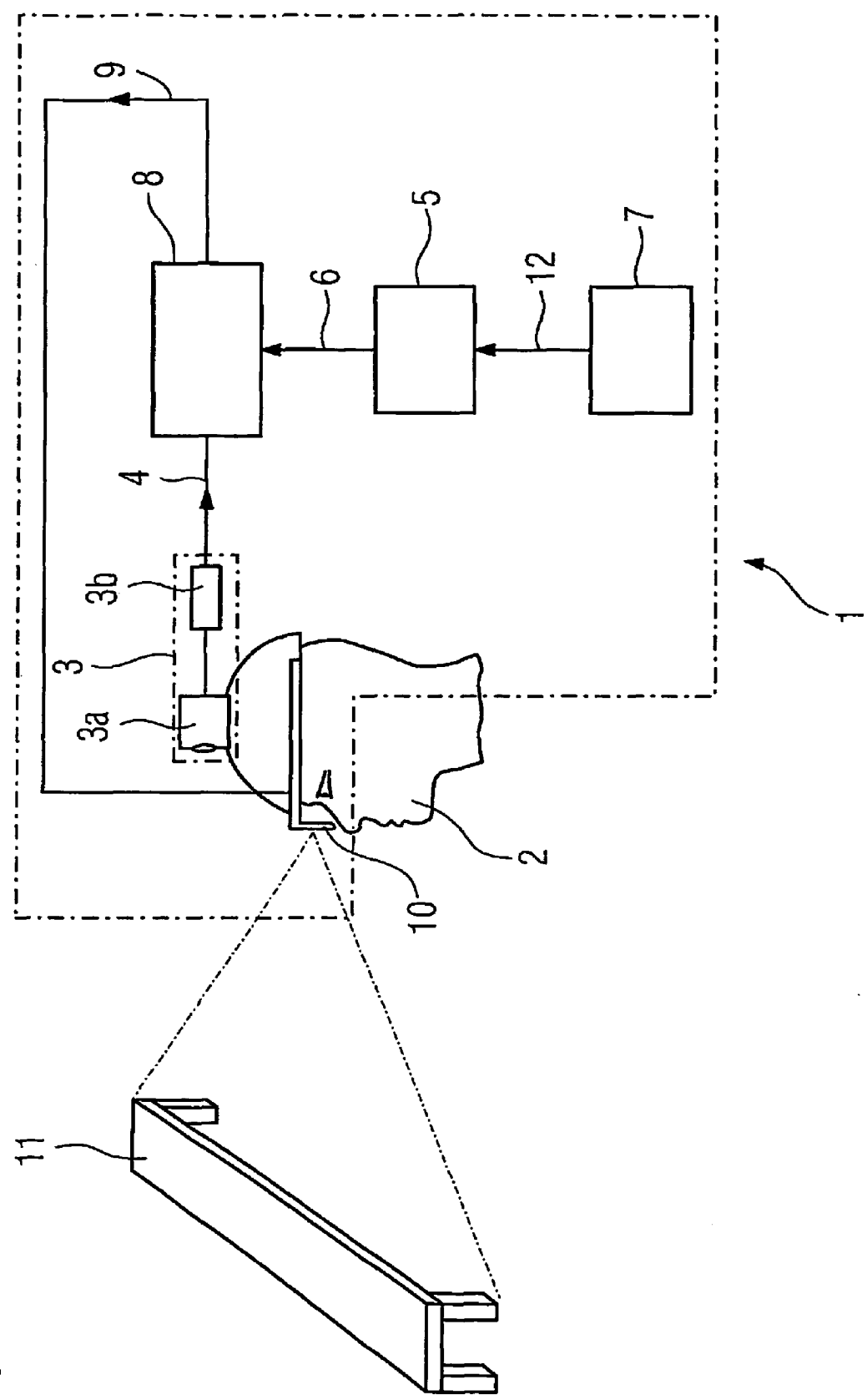
FIG. 1 a schematic diagram of a system for presenting information, especially augmented-reality information, for at least one user and FIG. 2 a more detailed diagram of an embodiment of the system shown in FIG. 1.

FIG. 1 shows a schematic diagram of a system 1 for presentation of information, especially augmented-reality information, for at least one user 2. A real installation 11, which can for example be a lifting table, is located in the field of vision of the user 2. The user 2 wears a recording device 3a on his head, for example a sensor, which is part of a recording unit 3. The environment of the user 2 is recorded with the aid of the recording device 3a and corresponding environment information 4 is generated with a processing unit 3b which identifies the position and the angle of view of the user 2 in relation to the real installation 11.

The system features a first storage medium 5 in which image information 6 relating to real and virtual objects is stored. The image information 6 describes the real and virtual object in the form of three-dimensional models.

The system 1 further comprises a simulation system 7 with which simulation data 12 is generated. The image information 6 stored in the storage medium 5 is in this case continuously updated by the simulation data 12 generated by the simulation system 7.

A processing unit 8 now links the image information 6 and the environment information 4 to a new volume of data 9 which can be displayed with the aid of a reproduction unit 10. Through the linkage of the image information 6 and the environment information 4 by a processing device 8 a positionally-accurate inclusion of the newly generated image information 9 into the field of view of the user 2 is possible. In this case areas concealed by the lifting table 11 of the geometrical installations described by the image information 6 are made visible to the user. The visualization of the data 6 for describing the virtual objects stored in the storage medium 5 is thus and taken in context to the real environment of the user 2, with the user obtaining a correct presentation both of the virtual and also of the real objects in his environment in all three spatial dimensions. In the presentation of the augmented reality the simulation system 7 also enables a dynamic presentation of the real and virtual objects stored in first storage medium 5.

Figure 2:
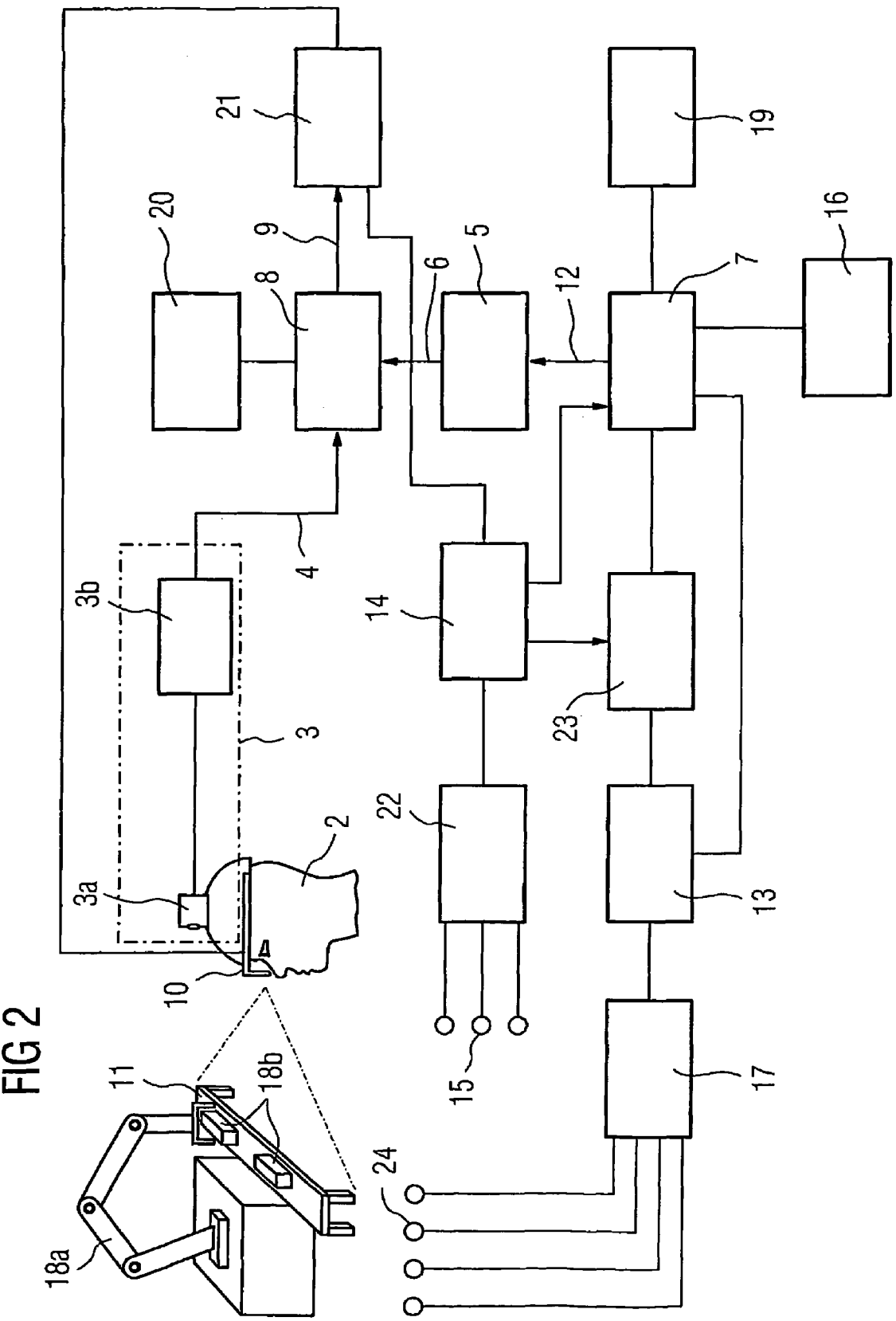

FIG. 2 shows a more detailed presentation of an embodiment of the system shown in FIG. 1. A real installation 11 is located in the field of view of a user 2, which again can be a lifting table. With the aid of a recording unit 3 consisting especially of a recording device embodied as the sensor 3a and a processing unit 3b. the position and the angle of view of the user 2 in relation to the real installation 11 is recorded and is passed to the processing unit 8 in the form of environment information 4 which is present in the shape of a matrix. The processing unit 3b can especially be a tracking system.

In a first storage medium 5 there is image information 6 for describing the three-dimensional model of one or more virtual or real installations. In the example shown the virtual or real installations are a virtual robot 18a and virtual packages 18b. In a future scenario to be presented visually for example the virtual packages 18b could be transported and/or lifted from the real lifting table 11 and sorted by the virtual robot 18a in accordance with one or more quality criteria.

A simulation system 7 generates a set of simulation data 12 on the basis of which the image information 6 stored in the storage medium 5 is continuously updated. A dynamization of the virtual objects 18a and 18b is thus possible with the aid of the simulation system 7.

A simulation model is stored in a fourth storage medium 19 of which contains all the necessary data to enable the physical behavior and the control behavior both of real and also of virtual components to be stimulated sufficiently accurately. The simulation model also describes the dependency between the objects (e.g. package which lies on the lifting table and is to be transported according to the current conveying speed).

The processing unit 8 links the environment information 4 and the image information of the virtual installations 18a and 18b continuously updated by the simulation system to a new volume of data 9. To make it possible to incorporate the virtual image information 6 into the real environment at a precise location for the user 2 calibration information in the form of matrices is stored in a fifth storage medium 20 which describes geometrical deviations between the sensor of the recording system 3a, the eye o f the user 2 and the reproduction unit 10. The parts of the virtual geometrical installations 18a and 18b which are concealed by the lifting table are edited out by the processing unit 8. Thus the user 2 in a presentation of the volume of data 9 obtains a correct three-dimensional impression of the augmented reality consisting of the lifting table 11, the virtual robot 18a and the virtual packages 18b.

The volume of data 9 generated by the processing unit 8 is converted with the aid of a video card 21 into a signal that can be presented by the reproduction unit 10.

The system 1 further comprises an application controller 14 with the aid of which the simulation system 7 can be accessed and a real process, in this case for example an active lifting table 11, can be controlled. To this end the user 2 has an application Interface 15 available to them which can comprise a mouse, a keyboard also a microphone for example. The control commands entered by the user 2 via the application Interface 15 are converted with the aid of one or more device drivers 22 into a signal for the application controller 14. The commands available for the user 2 can be displayed by the application controller 14 with the aid of the video card 21 on the reproduction device 10.

A process controller 23 subordinate to the application controller contains the necessary scheduling system and the necessary control programs to control the lifting table in accordance with a predetermined schedule. In this case this can for example be a Programmable Logic Controller (PLC) with its associated data and function modules.

The current status values of the lifting table 11 are stored in a second storage medium 13 as well as current actuator values to be set via a process interface 24. Sensor and actuator values stored in the second storage medium 13 can be both read by the simulation system 7 in order to perform modifications of the ongoing simulation, and al so modified in order to effect a change to the ongoing process via the process Interface 24. The current sensor values of the lifting table 11 can be read in with the aid of a process link 17 and the current actuator values of the lifting table 11 can also be set. The sensor values are stored with the process image held in the second storage medium 13 and the actuator values are read out from the process image stored in the second storage medium 13.

The system 1 described thus allows access by the user 2 via the user interface 15 both to the execution of the simulation and also to the process actually running on the lifting table 11. Furthermore the real process and the simulation can mutually influence each other.

The system 1 features a third storage medium 16 in which data generated during the simulation is continuously stored. This data recorded continuously or cyclically over a defined period of time is sufficiently accurate to enable the processes recorded by the simulation system 7 to be played back in slow motion or fast motion. This is possible in both the forwards and also backwards direction along the time axis.

A possible procedure for using the system 1 is as follows:
1. User (2) with AR device records the real installation 11.
2. User 1 initiates simulation process in the context of the real installation 11.
3. Simulation process synchronizes itself with a real installation 11.
4. The visual simulation results in the field of view of the user 2 are bought into alignment with the real installation 11 with the aid of the tracking method.
5. User 2 influences the fast motion/slow motion of the simulation process
6. User 2 sees manufacturing/environment processes in the future in the real environment provided for them or in context with the real installation 11

The system 1 described here has two main modes. In the first mode, process active, the real components are controlled directly via the process controller 23 and the process link 17. In the second mode, process passive, the real components are not accessed via the process link 17. The modes are activated via the application controller 14. The behavior of the system 1 or of the system components in the two modes is as follows.

In the process active mode the real components are accessed via the process link 17. There is a dynamization of the reality and a matching dynamization and inclusion of the virtual components 18a and 18b. The system components are however set so that the calculated or recorded positions of the real components, in this case of the lifting table 11, are reflected in the three-dimensional model but not incorporated as components of the processing system 8 but only employed to edit out the concealed parts of the virtual components 18a and 18b.

In the process passive mode the real components (of the lifting table 11) are not accessed via the process link 17 and are in a defined idle state. There is no real dynamization of the real installation or of the lifting table 11 but instead a simulated dynamization of the reality. The matching dynamization and incorporation of the virtual components 18a and 18b is undertaken in parallel. The system components are set in this case so that the calculated or recorded positions of the lifting table are reflected in the three dimensional model and are displayed by the processing system 8 together with the three-dimensional model of the virtual components 18a and 18b. If there is a match between the calculated position of the lifting table 11 and the actual position of the lifting table 11, the three-dimensional model of the lifting table 11 is not displayed but only used for the calculation of the editing out. This mode is especially also used for the slow motion and fast motion functionality of the system 1.

In summary the invention relates to a system and a method within an augmented-reality (AR) system for visual presentation of simulation results in a mixed virtual/real environment. The system or method makes it possible for one all more users to execute simulation results in the context of real environment, especially in the area of industrial automation technology, and to visually present their static and dynamic results in the context of the real environment. Processes running in the real environment are recorded and synchronized with the simulation. The mutual influencing of real processes and the simulation is made possible with a control unit. Furthermore the user can control the execution sequence of the simulation by a user interface.

The invention claimed is:

1. A method for performing a simulation in an industrial automation system for observation by at least one user, comprising:
    placing a real component of the industrial automation system under the control of a process controller, the real component having a process setting determinable by input of a process value via a process link;
    providing a process interface in the automation system for receiving input from the process link and connected for setting the real component in accord with the process value;
    controlling the real component via the process controller and the process link, wherein the real component forms part of a real environment; and
    providing a mixed virtual/real environment for presentation to the user of a dynamic simulation in a context which includes the real component in the real environment by augmenting the real environment with a simulated dynamization, thereby providing the user with a dynamic simulation in the context of the real environment, wherein ongoing processes running in the real environment are recorded and synchronized with the dynamic simulation, and wherein execution of the dynamic simulation is controllable by the user.

2. The method in accordance with claim 1, wherein the mixed virtual/real environment is displayed to the user by generating a volume data set representing the virtual objects and the real component.

3. The method in accordance with claim 2, wherein while under the control of the process controller, the real component receives actuator values having a process setting determinable by input of a process value via a process link, and provides one or more sensor values associated with one or more states of the component during operation, the method further including:
    storing the sensor and actuator values for the real component; and
    for provision of the mixed virtual/real environment with the simulated dynamization, providing the sensor and actuator values to perform modifications to the ongoing simulated dynamization.

4. The method in accordance with claim 1, further including recording data during the ongoing simulated dynamization to enable playback of the recorded dynamization in slow motion and in a backwards direction in time.

* * * * *